United States Patent
Tachibanada et al.

(10) Patent No.: US 9,951,865 B2
(45) Date of Patent: Apr. 24, 2018

(54) CONTROL APPARATUS

(71) Applicant: HONDA MOTOR CO., LTD., Tokyo (JP)

(72) Inventors: Yuya Tachibanada, Wako (JP); Yutaka Ishikawa, Wako (JP); Aaron Hoover, California, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 378 days.

(21) Appl. No.: 14/736,933

(22) Filed: Jun. 11, 2015

(65) Prior Publication Data

US 2016/0363216 A1 Dec. 15, 2016

(51) Int. Cl.
- *F16H 61/02* (2006.01)
- *F16H 3/66* (2006.01)
- *F16H 61/04* (2006.01)

(52) U.S. Cl.
CPC .......... *F16H 61/0246* (2013.01); *F16H 3/66* (2013.01); *F16H 2061/0485* (2013.01); *F16H 2200/0069* (2013.01); *F16H 2200/2012* (2013.01); *F16H 2200/2046* (2013.01); *F16H 2200/2066* (2013.01); *F16H 2200/2082* (2013.01)

(58) Field of Classification Search
CPC .............. F16H 61/0246; F16H 3/66; F16H 2061/0485; F16H 2061/0466; F16H 2200/2066
See application file for complete search history.

(56) References Cited

U.S. PATENT DOCUMENTS

| | | | | |
|---|---|---|---|---|
| 6,746,359 B2* | 6/2004 | Kang | ........................ | F16H 3/66 475/118 |
| 8,790,202 B2* | 7/2014 | Sakai | ..................... | B60K 6/365 475/5 |
| 8,983,703 B2* | 3/2015 | Akebono | ................. | B60K 6/48 180/65.28 |
| 9,140,358 B2* | 9/2015 | Tachibanada | ........... | F16H 61/68 |
| 9,360,085 B2* | 6/2016 | Shim | ........................ | F16H 3/66 |
| 9,587,738 B2* | 3/2017 | Toyokawa | .............. | F16H 61/12 |
| 2014/0303860 A1 | 10/2014 | Tachibanada et al. | | |
| 2016/0325751 A1* | 11/2016 | Kaifuku | .................... | B60K 6/44 |
| 2016/0363216 A1* | 12/2016 | Tachibanada | ............. | F16H 3/66 |

FOREIGN PATENT DOCUMENTS

JP 2014-202340 A 10/2014

* cited by examiner

*Primary Examiner* — Jacob S. Scott
*Assistant Examiner* — Tinh Dang
(74) *Attorney, Agent, or Firm* — Westerman, Hattori, Daniels & Adrian, LLP

(57) ABSTRACT

An automatic transmission of this invention includes a plurality of engaging mechanisms, and the plurality of engaging mechanisms include a mechanical engaging mechanism that functions as a brake. The mechanical engaging mechanism can switch a rotational element between a first state in which rotation is restricted only in one direction and a second state in which rotation is restricted in both directions. When switching from the first state to the second state, engagement control is started in advance for at least one of the plurality of engaging mechanisms to be set in an engaging state.

10 Claims, 8 Drawing Sheets

FIG. 2A

|      | C1 | C2 | C3  | B1 | B2 | B3  | F1    | GEAR RATIO |
|------|----|----|-----|----|----|-----|-------|------------|
| RVS  |    |    | ○   |    | ○  |     | ○     | 4.008      |
| 1st  |    |    |     | ○  | ○  | (○) | △/○   | 5.233      |
| 2nd  |    | ○  |     | ○  | ○  |     | (△)   | 3.367      |
| 3rd  |    |    | ○   | ○  | ○  |     | (△)   | 2.298      |
| 4th  |    | ○  | ○   | ○  |    |     | (△)   | 1.705      |
| 5th  | ○  |    | ○   | ○  |    |     | (△)   | 1.363      |
| 6th  | ○  | ○  | ○   |    |    |     | (△)   | 1.000      |
| 7th  | ○  |    | ○   |    | ○  |     | (△)   | 0.786      |
| 8th  | ○  | ○  |     |    | ○  |     | (△)   | 0.657      |
| 9th  | ○  |    |     |    | ○  | ○   | (△)   | 0.584      |
| 10th | ○  | ○  |     |    |    | ○   | (△)   | 0.520      |
| P/N  |    |    | (○) |    |    |     | △/○   | –          |
| RPM  | ○  |    | ○   |    |    | ○   | △→○   | –          |

FIG. 2B

| PLANETARY GEAR MECHANISM | GEAR RATIO |
|--------------------------|------------|
| P1                       | 2.681      |
| P2                       | 1.914      |
| P3                       | 1.614      |
| P4                       | 2.734      |

FIG. 5

| STEP | ENGAGING OPERATION | | | | | | | | CHANGE CONDITION |
|---|---|---|---|---|---|---|---|---|---|
| | B3 | B2 | B1 | C3 | C2 | C1 | F1 | | |
| 1 | — | → | → | — | — | — | F1 △ | | COMPLETION OF RELEASE |
| 2 | ○ | — | — | ○ | — | ○ | F1 △ | | INPUT ROTATION SPEED≒0 COMPLETION OF ENGAGEMENT OF C1, ETC. |
| 3 | ○ | — | — | ○ | — | ○ | F1 ○ | | COMPLETION OF SWITCHING OF F1 |
| 4 | → | ○ | — | ○ | — | → | F1 ○ | | |

→ : RELEASING ○ : ENGAGE — : RELEASE F1/△ : ONE-WAY ROTATION PERMISSION F1/○ : ROTATION INHIBITION

CONTROL APPARATUS

BACKGROUND OF THE INVENTION

Field of the Invention

The present invention relates to a control apparatus for an automatic transmission.

Description of the Related Art

An automatic transmission generally includes planetary gear mechanisms and engaging mechanisms such as a clutch and a brake, and implements each gear range by switching the power transmission path by the engaging mechanisms. As the engaging mechanisms, employing a mechanical engaging mechanism has been proposed in addition to a hydraulic engaging mechanism. In particular, an arrangement that uses a clutch (two-way clutch) capable of switching to a state to do two-way rotation restriction as a brake has been proposed (for example, Japanese Patent Laid-Open No. 2014-202340).

When the two-way clutch is used as a brake, a rotational element connected to the two-way clutch can be switched between a state in which rotation is restricted only in one direction (rotation in the reverse direction is permitted) and a state in which rotation is restricted in both directions. When switched to the state in which rotation is restricted in both directions, the rotational element connected to the two-way clutch is fixed to the casing. For this reason, if switching is done during rotation of the rotational element, unusual noise or vibration occurs, and the two-way clutch breaks. To prevent this, switching is performed after confirming that the rotational element stands still.

In an arrangement that switches the two-way clutch to the state to restrict rotation in both directions when switching the gear range to the reverse range, switching the state of the two-way clutch is needed before the reverse range is put in gear. To implement a smooth start, this operation is preferably quickly performed.

SUMMARY OF THE INVENTION

It is an object of the present invention to implement a smoother start when the reverse range is selected.

According to an aspect of the present invention, there is provided a control apparatus for an automatic transmission, the automatic transmission comprising: an input shaft to which a driving force is input; an output member; a plurality of planetary gear mechanisms configured to transmit the driving force input to the input shaft to the output member; and a plurality of engaging mechanisms capable of establishing a plurality of gear ranges by switching a transmission path of the driving force in the plurality of planetary gear mechanisms, wherein one of the plurality of engaging mechanisms comprises a mechanical engaging mechanism configured to function as a brake, the mechanical engaging mechanism can be switched between a first state in which rotation of a predetermined rotational element out of a plurality of rotational elements included in the plurality of planetary gear mechanisms is restricted only in one direction and a second state in which the rotation of the predetermined rotational element is restricted in both directions, the plurality of gear ranges include at least one forward range that can be established in the first state of the mechanical engaging mechanism, and a reverse range to be established in the second state of the mechanical engaging mechanism, the control apparatus comprises: a detection unit configured to detect a shift position; and a control unit configured to control the plurality of engaging mechanisms, the control unit executes switching control to switch the mechanical engaging mechanism from the first state to the second state when the detection unit detects that the shift position is switched to the reverse range and the mechanical engaging mechanism is in the first state, in the switching control, after a plurality of predetermined engaging mechanisms other than the mechanical engaging mechanism out of the plurality of engaging mechanisms are controlled to an engaging state, the mechanical engaging mechanism is switched from the first state to the second state, the control unit starts pre-engagement control to engage at least one engaging mechanism out of the plurality of predetermined engaging mechanisms when a first condition is met, and the first condition includes a condition that the mechanical engaging mechanism is in the first state and the automatic transmission is under a lowest-speed forward range.

According to another aspect of the present invention, there is provided a control apparatus of an automatic transmission, the automatic transmission comprising: an input shaft to which a driving force is input; an output member; a plurality of planetary gear mechanisms configured to transmit the driving force input to the input shaft to the output member; and a plurality of engaging mechanisms capable of establishing a plurality of gear ranges by switching a transmission path of the driving force in the plurality of planetary gear mechanisms, wherein one of the plurality of engaging mechanisms comprises a mechanical engaging mechanism configured to function as a brake, the mechanical engaging mechanism can be switched between a first state in which rotation of a predetermined rotational element out of a plurality of rotational elements included in the plurality of planetary gear mechanisms is restricted only in one direction and a second state in which the rotation of the predetermined rotational element is restricted in both directions, the plurality of gear ranges include at least one forward range that can be established in the first state of the mechanical engaging mechanism, and a reverse range to be established in the second state of the mechanical engaging mechanism, the control apparatus comprises: a detection unit configured to detect a shift position; and a control unit configured to control the plurality of engaging mechanisms, the control unit executes switching control to switch the mechanical engaging mechanism from the first state to the second state when the detection unit detects that the shift position is switched to the reverse range and the mechanical engaging mechanism is in the first state, in the switching control, after a plurality of predetermined engaging mechanisms other than the mechanical engaging mechanism out of the plurality of engaging mechanisms are controlled to an engaging state, the mechanical engaging mechanism is switched from the first state to the second state, and the control unit starts pre-engagement control to engage at least one engaging mechanism out of the plurality of predetermined engaging mechanisms when the mechanical engaging mechanism is in the first state and the detection unit detects that the shift position is a non-running range.

Further features of the present invention will become apparent from the following description of exemplary embodiments (with reference to the attached drawings).

BRIEF DESCRIPTION OF THE DRAWINGS

FIG. 2A is a view showing an example of the engagement table of engaging mechanisms;

FIG. 2B is a view showing the gear ratios of planetary gear mechanisms;

FIG. 5 is a view for explaining the outline of processing performed when the reverse range is selected;

DESCRIPTION OF THE EMBODIMENTS

Figure 1:
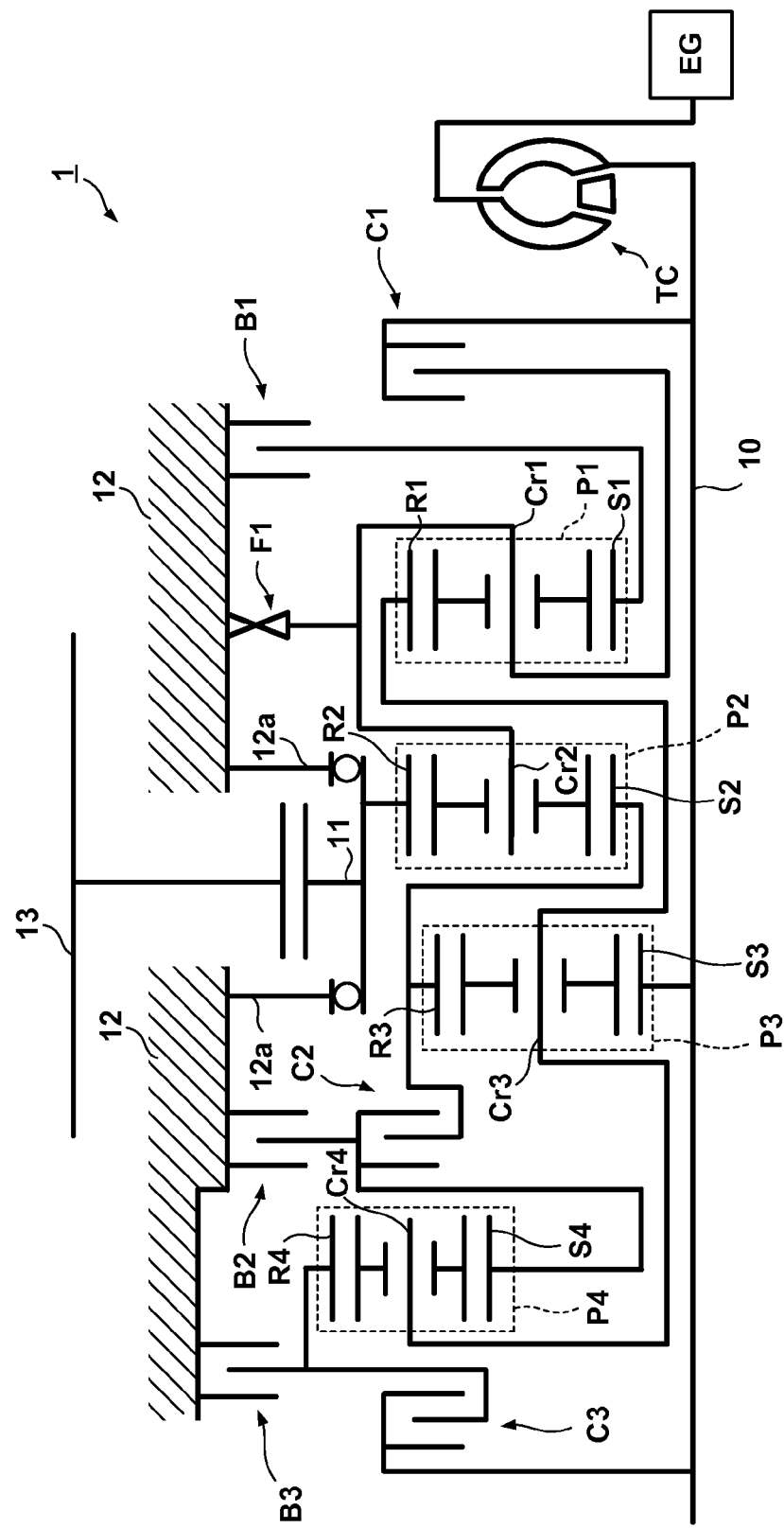
FIG. 1 is a skeleton diagram of an automatic transmission according to an embodiment of the present invention.

FIG. 1 is a skeleton diagram of an automatic transmission 1 according to an embodiment of the present invention. Referring to FIG. 1, the automatic transmission 1 includes an input shaft 10 rotatably axially supported in a casing 12 that forms a transmission case, an output member 11 rotatably supported by support members 12a supported in the casing 12 so as to be coaxial with respect to the input shaft 10, and an output shaft (counter shaft) 13.

A driving force from an internal combustion engine EG (to be sometimes simply referred to as EG) is input to the input shaft 10, and the input shaft 10 is rotated by the driving force. A starting device is provide between the input shaft 10 and the internal combustion engine EG. Examples of the starting device are a clutch type starting device (single disc clutch, multiple disc clutch, or the like) and a hydraulic coupling type starting device (torque converter or the like). In this embodiment, a torque converter TC is provided. Hence, the driving force of the internal combustion engine EG is input to the input shaft 10 through the torque converter TC.

The output member 11 includes a gear concentric to the input shaft 10. The output shaft 13 includes a gear that engages with the gear. The rotation of the input shaft 10 changes its speed through transmission mechanisms to be described below and is then transmitted to the output shaft 13. The rotation (driving force) of the output shaft 13 is transmitted to driving wheels through, for example, differential gears (not shown).

As the transmission mechanisms, the automatic transmission 1 includes planetary gear mechanisms P1 to P4 and engaging mechanisms C1 to C3, B1 to B3, and F1. In this embodiment, the planetary gear mechanisms P1 to P4 are single pinion type planetary gear mechanisms. The planetary gear mechanisms P1 to P4 transmit the driving force from the input shaft 10 to the output member 11. The planetary gear mechanisms P1 to P4 can form a plurality of driving force transmission paths. The engaging mechanisms C1 to C3, B1 to B3, and F1 switch the driving force transmission paths of the planetary gear mechanisms P1 to P4, thereby establishing a plurality of gear ranges.

The planetary gear mechanisms P1 to P4 include sun gears S1 to S4, ring gears R1 to R4, and carriers Cr1 to Cr4 each supporting a pinion gear, respectively, as rotational elements (12 in total), and are disposed to be coaxial with respect to the input shaft 10.

When ordered in accordance with the arrangement order at intervals corresponding to gear ratios shown in the velocity diagram of FIG. 3 (to be described later), the sun gear S1, the carrier Cr1, and the ring gear R1 of the planetary gear mechanism P1 can be referred to as a first rotational element, a second rotational element, and a third rotational element in this order.

Similarly, the sun gear S2, the carrier Cr2, and the ring gear R2 of the planetary gear mechanism P2 can be referred to as a fourth rotational element, a fifth rotational element, and a sixth rotational element in this order.

Similarly, the sun gear S3, the carrier Cr3, and the ring gear R3 of the planetary gear mechanism P3 can be referred to as a seventh rotational element, an eighth rotational element, and a ninth rotational element in this order.

Similarly, the sun gear S4, the carrier Cr4, and the ring gear R4 of the planetary gear mechanism P4 can be referred to as a 10th rotational element, a 11th rotational element, and a 12th rotational element in this order.

Each of the engaging mechanisms C1 to C3, B1 to B3, and F1 functions as a clutch or a brake. A clutch connects/disconnects the rotational elements provided in the automatic transmission 1. A brake connects/disconnects the rotational elements provided in the automatic transmission 1 to/from the casing 12. The rotational elements provided in the automatic transmission 1 include the input shaft 10 and the sun gears, ring gears, and carriers of the planetary gear mechanisms P1 to P4.

In this embodiment, the engaging mechanisms C1 to C3 are clutches, and the engaging mechanisms B1 to B3 and F1 are brakes. Hence, the engaging mechanisms C1 to C3 are sometimes called the clutches C1 to C3, and the engaging mechanisms B1 to B3 and F1 are sometimes called the brakes B1 to B3 and F1. When the engaging mechanisms C1 to C3 and B1 to B3 are switched between an engaging state (fastening state) and a release state, and the state of the engaging mechanism F1 is switched, the driving force transmission path from the input shaft 10 to the output member 11 is switched, and the plurality of gear ranges are implemented.

In this embodiment, all the engaging mechanisms C1 to C3 and B1 to B3 are assumed to be hydraulic friction engaging mechanism. Examples of the hydraulic friction engaging mechanism are dry and wet single disc clutches and dry and wet multiple disc clutches.

The engaging mechanism F1 is provided between the casing 12 and predetermined rotational elements (here, the carriers Cr1 and Cr2 connected to each other). The engaging mechanism F1 can be switched between a one-way rotation permission state (to be sometimes referred to as OWC) in which the rotation of the predetermined rotational elements (carriers Cr1 and Cr2) is restricted only in one direction, and rotation in the reverse direction is permitted and a rotation inhibition state (to be sometimes referred to as TWC) in which rotation is restricted in both directions.

In the one-way rotation permission state, the same function as a so-called one-way clutch is implemented. In this state, the rotational elements transmit the driving force in one rotation direction but slip in the reverse direction. In this embodiment, the engaging mechanism F1 functions as a brake. For this reason, if the engaging mechanism F1 is in the one-way rotation permission state, the predetermined rotational elements (carriers Cr1 and Cr2) are permitted to rotate only in one direction. In the rotation inhibition state, the rotational elements transmit the driving force in both rotation directions. In this embodiment, the engaging mechanism F1 functions as a brake. For this reason, if the engaging mechanism F1 is in the rotation inhibition state, the predetermined rotational elements (carriers Cr1 and Cr2) are inhibited from rotating in both directions.

As the engaging mechanism F1, for example, a known two-way clutch can be employed. Some known two-way clutches can be switched between the one-way rotation permission state, the rotation inhibition state, and a two-way rotation permission state by driving control of a corresponding hydraulic actuator or electromagnetic actuator. Some known two-way clutches can further switch the one-way rotation permission state between a forward rotation permission state and a reverse rotation permission state. In this embodiment, switching between the one-way rotation permission state and the rotation inhibition state suffices, and using only the permission state in one rotation direction as the one-way rotation permission state suffices. However, a two-way clutch capable of selecting another state such as the two-way rotation permission state may be employed.

The connection relationship between the components will be described next with reference to FIG. 1.

The sun gear S3 of the planetary gear mechanism P3 is connected to the input shaft 10. The ring gear R3 is connected to the sun gear S2 of the planetary gear mechanism P2. The carrier Cr3 is connected to the ring gear R1 of the planetary gear mechanism P1 and the carrier Cr4 of the planetary gear mechanism P4. The carrier Cr2 of the planetary gear mechanism P2 is connected to the carrier Cr1 of the planetary gear mechanism P1. The ring gear R2 is connected to the output member 11. Hence, the planetary gear mechanism P2 transmits the driving force to the output shaft 13.

The clutch C1 connects the input shaft 10 to the carrier Cr1 of the planetary gear mechanism P1 and the carrier Cr2 connected to the carrier Cr1 in the engaging state, and disconnects them in the release state. Note that the release state will sometimes be referred to as a disengaging state. The clutch C2 connects the ring gear R3 of the planetary gear mechanism P3 to the sun gear S4 of the planetary gear mechanism P4 in the engaging state, and disconnects them in the release state. The clutch C3 connects the input shaft 10 to the ring gear R4 of the planetary gear mechanism P4 in the engaging state, and disconnects them in the release state.

The brake B1 connects the casing 12 to the sun gear S1 of the planetary gear mechanism P1 in the engaging state, and disconnects them in the release state. The brake B2 connects the casing 12 to the sun gear S4 of the planetary gear mechanism P4 in the engaging state, and disconnects them in the release state. The brake B3 connects the casing 12 to the ring gear R4 of the planetary gear mechanism P4 in the engaging state, and disconnects them in the release state.

As already described, the brake F1 restricts the rotation of the carrier Cr2 of the planetary gear mechanism P2 (and the carrier Cr1 connected to the carrier Cr2) only in one direction in the one-way rotation permission state, and fixes the carrier Cr2 of the planetary gear mechanism P2 (and the carrier Cr1 connected to the carrier Cr2) to the casing 12 in the rotation inhibition state.

FIG. 2A is an engagement table (fastening table) showing the engaging combination of the engaging mechanisms provided in the automatic transmission 1. FIG. 2B shows the gear ratios of the planetary gear mechanisms provided in the automatic transmission 1. FIG. 3 is a velocity diagram (collinear diagram) of the automatic transmission 1. "Gear ratio" in FIG. 2A indicates the gear ratio between the input shaft 10 and the output member 11.

In this embodiment, 10 forward ranges (1st to 10th) and one reverse range (RVS) can be established. "P/N" represents non-running ranges; "P", a parking range; and "N", a neutral range. "RPM" represents an engaging combination in RVS preparation processing (to be described later). In this processing, the brake F1 is switched from the one-way rotation permission state to the rotation inhibition state.

In the example of the engaging table shown in FIG. 2A, "○" indicates the engaging state, and no mark indicates the release state. Note that there are included engaging mechanisms that are set in the engaging state for smooth change to adjacent gear ranges, although the engagement is not essential to establish the gear ranges. For example, in the first range (1st), engagement of the brake B2 is not essential. However, when changing to the reverse range (RVS) or second range (2nd), the brake B2 is set in the engaging state for the purpose of decreasing the engaging mechanisms to switch the engaging state. Similarly, in the fifth range (5th), engagement of the clutch C3 is not essential. However, when changing to the fourth range (4th) or sixth range (6th), the clutch C3 is set in the engaging state for the purpose of decreasing the engaging mechanisms to switch the engaging state.

As for the brake F1, "○" indicates the rotation inhibition state, and "Δ" indicates the one-way rotation permission state. In the first range (1st), the brake F1 can be set in either the rotation inhibition state or the one-way rotation permission state. In the rotation inhibition state, the engine brake is enabled. In the one-way rotation permission state, the engine brake does not take hold. An algorithm to set the brake F1 in one of the states in the first range (1st) can appropriately be designed. In this embodiment, the state before a change to the first range (1st) is inherited. For example, when changed from the reverse range (RVS) to the first range (1st), the brake F1 remains in the rotation inhibition state in the first range (1st). However, if, for example, the vehicle speed exceeds a predetermined speed, the brake F1 may be switched to the one-way rotation permission state. Similarly, when changed from other forward ranges (2nd to 10th) to the first range (1st), the brake F1 remains in the one-way rotation permission state in the first range 1st).

In the non-running ranges (P/N) as well, the state of the brake F1 can be either the rotation inhibition state or the one-way rotation permission state. In this embodiment, the state before a change to the non-running ranges (P/N) is inherited, as in the first range (1st).

In the second range (2nd) to the 10th range (10th), the brake F1 is set in the one-way rotation permission state, but slips because of the structure of the automatic transmission 1. For this reason, the state of the brake F1 is indicated by "(Δ)". If the brake F1 is a mechanical engaging mechanism capable of selecting the above-described two-way rotation permission state, it can be set in the two-way rotation permission state in the second range (2nd) to the 10th range (10th).

Note that in this embodiment, in the second range (2nd) to the 10th range (10th), the one-way rotation permission state is selected as the state of the brake F1. However, depending on the structure of the automatic transmission 1, an arrangement for selecting the rotation inhibition state can also be employed.

Referring to FIG. 2A, "(○)" of the brake B3 in the first range 1st) and "(○)" of the clutch C3 in the non-running ranges (P/N) indicate that they may be set in the engaging state by pre-switching control (to be described later).

Figure 3:
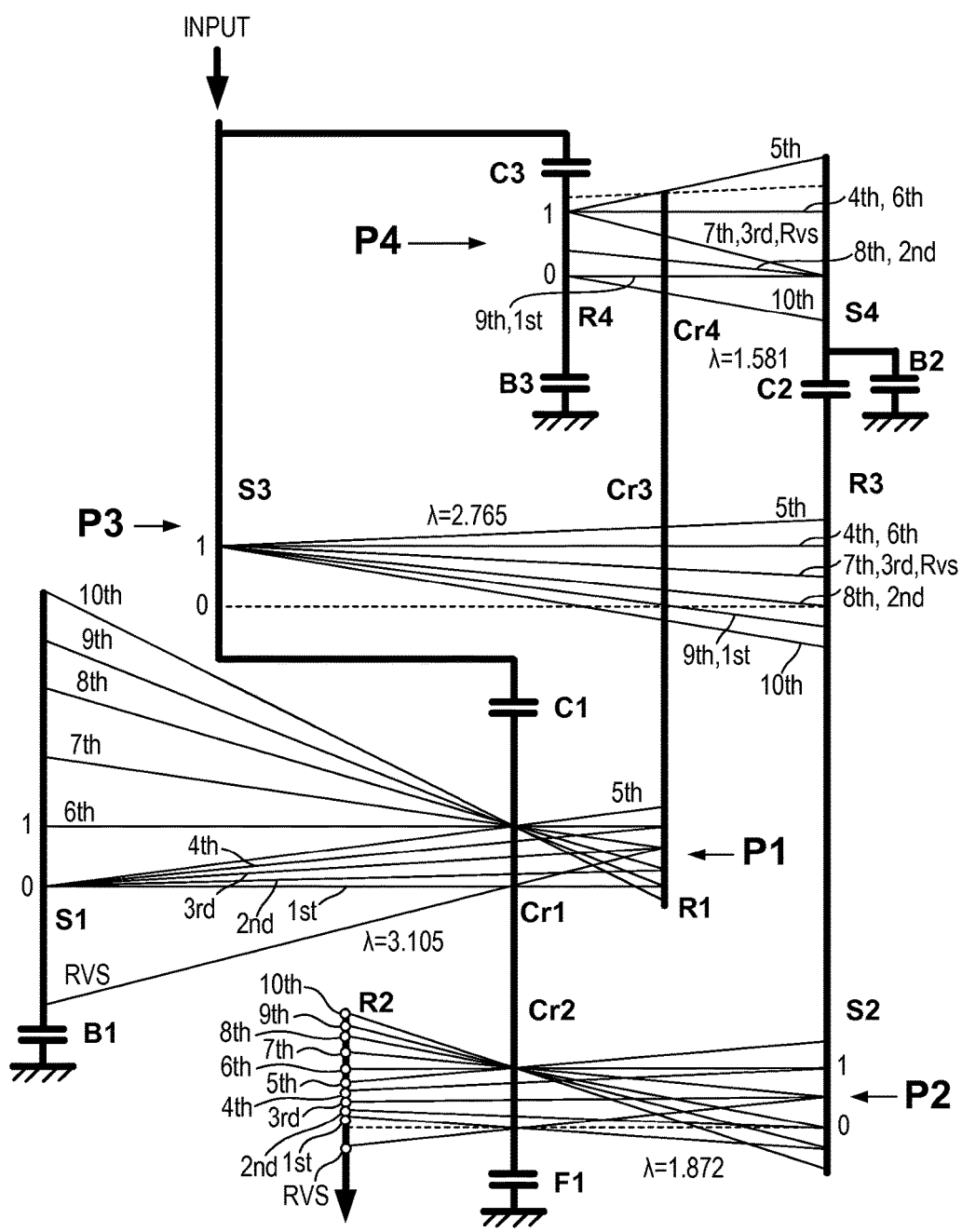
FIG. 3 is a velocity diagram of the automatic transmission shown in FIG. 1.

The velocity diagram of FIG. 3 shows the rotation speed ratio of each element to the input to the input shaft 10 in each gear range. The ordinate represents the speed ratio. "1" indicates the same rotation speed as the input shaft 10, and "0" indicates a stop state. The abscissa is based on the gear ratio between the rotational elements of the planetary gear mechanisms P1 to P4. λ is the gear ratio between a carrier Cr and a sun gear S. Note that in FIG. 3, elements corresponding to the output shaft 13 are not illustrated.

<Control Apparatus>

Figure 4A:
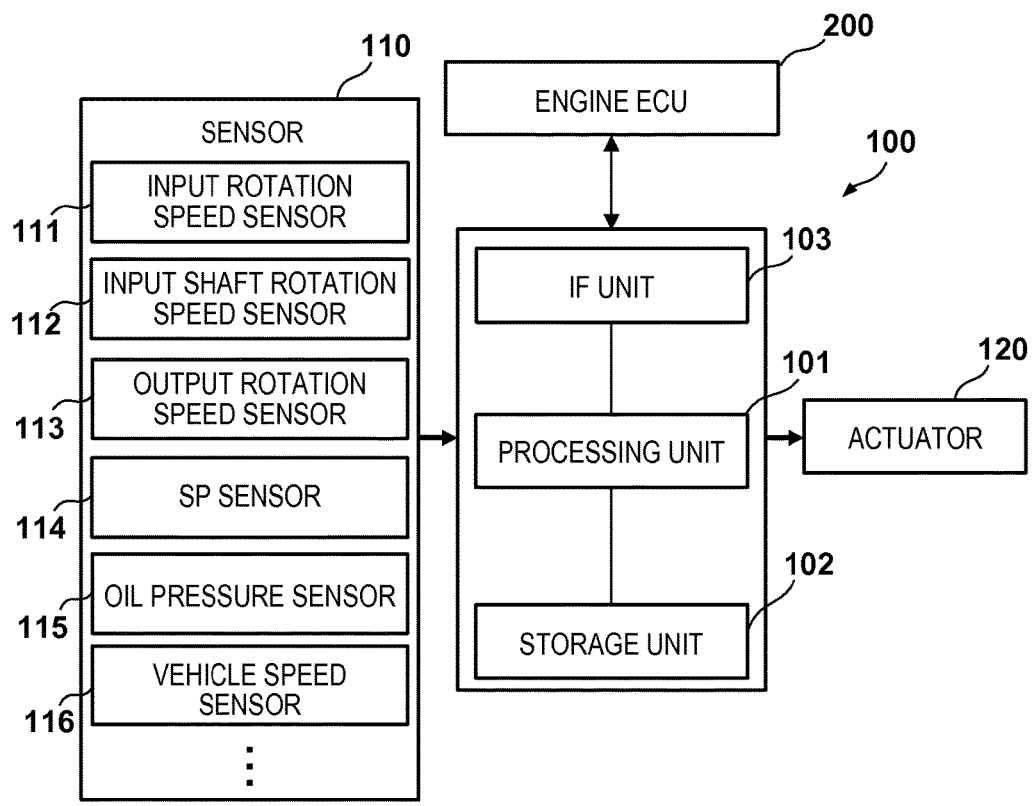
FIG. 4A is a block diagram showing an example of the control apparatus of the automatic transmission shown in FIG. 1.

FIG. 4A is a block diagram of a control apparatus 100 of the automatic transmission 1. The control apparatus 100 can control not only the automatic transmission 1 but also the internal combustion engine EG and the torque converter TC. In this embodiment, the internal combustion engine EG is assumed to be controlled by an engine ECU 200 provided independently of the control apparatus 100. The control apparatus 100 can receive various kinds of information of the internal combustion engine EG and the vehicle from the engine ECU 200. The control apparatus 100 can also transmit the information of the automatic transmission 1 to the engine ECU 200.

The control apparatus 100 includes a processing unit 101 such as a CPU, a storage unit 102 such as a RAM and ROM, and an IF unit 103 that interfaces the processing unit 101 and an external device or the engine ECU. The IF unit 103 is formed from, for example, a communication interface, an input/output interface, or the like.

The processing unit 101 executes a program stored in the storage unit 102 and controls various kinds of actuators 120 based on the detection results of various kinds of sensors 110.

The various kinds of sensors 110 include various kinds of sensors provided in the automatic transmission 1. FIG. 4A illustrates the following sensors.

An input rotation speed sensor 111 detects the rotation speed input from the internal combustion engine EG to the torque converter TC, that is, the rotation speed of the output shaft of the internal combustion engine EG. An input shaft rotation speed sensor 112 detects the rotation speed of the input shaft 10. A slip ratio ETR of the torque converter TC is calculated by ETR (%)=(rotation speed detected by input shaft rotation speed sensor 112)/(rotation speed detected by input rotation speed sensor 111)×100

An output rotation speed sensor 113 detects the rotation speed of the output shaft 13.

An SP sensor (shift position sensor) 114 detects a shift position selected by the driver. In this embodiment, four types of shift positions, that is, P range (parking range), D range (forward range), N range (neutral range), and R range (reverse range) are assumed. If the D range is selected, the processing unit 101 selects one of the first range (1st) to the 10th range (10th) in accordance with a gear change map stored in the storage unit 102 and changes the gear. If the R range is selected, the processing unit 101 selects the reverse range.

An oil pressure sensor 115 includes a sensor that detects the oil pressure of hydraulic oil in each of the engaging mechanisms C1 to C3 and B1 to B3. A vehicle speed sensor 116 detects the traveling speed of the vehicle on which the automatic transmission 1 is mounted.

The various kinds of actuators 120 include various kinds of sensors provided in the automatic transmission 1. For example, the actuators 120 include an electromagnetic actuator such as an electromagnetic solenoid that switches the operation state of each of the engaging mechanisms C1 to C3, B1 to B3, and F1. The processing unit 101 thus controls the various kinds of actuators 120.

Figure 4B:
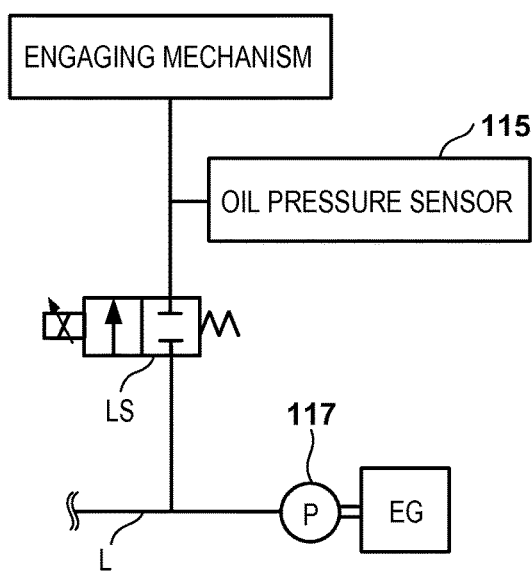
FIG. 4B is a view showing an example of the arrangement of an oil pressure sensor.

FIG. 4B shows an example of the arrangement of the oil pressure sensor 115. The oil pressure sensor 115 can be provided for, for example, each of the engaging mechanisms C1 to C3 and B1 to B3. The oil pressure of hydraulic oil in each engaging mechanism can thus be detected. Note that the oil pressure sensor 115 need not always be provided for each engaging mechanism.

A solenoid valve LS for supplying hydraulic oil is assigned to each engaging mechanism. A supply line L of hydraulic oil is opened or closed by the solenoid valve LS, thereby switching the engaging and release states of each engaging mechanism. The oil pressure sensor 115 is provided so as to receive the hydraulic oil supplied from the solenoid valve LS to the engaging mechanism. The detection result of the oil pressure sensor 115 represents the oil pressure of the hydraulic oil supplied to the engaging mechanism. An oil pump 117 driven by the internal combustion engine EG forces the hydraulic oil into the supply line L.

<Switching Control of Brake F1>

In this embodiment, the brake F1 is in the rotation inhibition state in the reverse range. When switching from the forward range or non-running range to the reverse range, the brake F1 can be switched from the one-way rotation permission state to the rotation inhibition state. At this time, the difference between the rotation speed of the brake F1 on the side of the casing 12 and that on the side of the carrier Cr2 is preferably 0. In other words, the rotation speed of the carrier Cr2 is preferably 0.

To do this, a combination of engaging mechanisms that changes the rotation speed of the carrier Cr2 to 0 intervenes. In this embodiment, there is no sensor for directly measuring the rotation speed of the carrier Cr2. For this reason, the carrier Cr2 and the input shaft 10 are connected, and it is confirmed from the detection result of the input shaft rotation speed sensor 112 or the like that the rotation speed of the carrier Cr2 is 0. After that, the brake F1 is switched to the rotation inhibition state.

FIG. 5 shows the engaging combination of engaging mechanisms when switching the gear range from the first forward range to the reverse range. When the gear range is the first forward range, the brakes B1 and B2 are in the engaging state, as shown in FIG. 2A. The brake F1 is assumed to be in the one-way rotation permission state.

First, as indicated by step 1 in FIG. 5, the brakes B1 and B2 are controlled to the release state. When release of the brakes B1 and B2 is completed, the process advances to step 2.

In step 2, the clutches C1 and C3 and the brake B3 engage. The ring gear R2 and the output shaft 13 are rotatable, and the driving wheels can freely rotate. It is therefore possible to avoid an unexpected behavior of the vehicle.

As is apparent from the velocity diagram of FIG. 3, when the clutch C3 and the brake B3 engage, the input shaft 10 is fixed to the casing 12. When the clutch C1 engages, the carrier Cr2 is connected to the input shaft 10.

Note that although step 2 is performed next to step 1 in this embodiment, steps 1 and 2 may be performed simultaneously. More specifically, control to engage the clutches C1 and C3 and the brake B3 may be performed while performing control to release the brakes B1 and B2. This can improve responsibility when switching the gear range to the reverse range.

If predetermined conditions are met, the process advances to step 3. The predetermined conditions are conditions to confirm that the rotation speed of the carrier Cr2 is 0. Basically, the conditions are completion of engagement of the clutch C1 and detection result of input rotation speed sensor 111 <predetermined value (for example, a value that can be regarded as 0). As for completion of engagement of the clutch C1, for example, when the detection result of the oil pressure sensor 115 of the clutch C1 indicates a predetermined oil pressure or when the control amount of the solenoid valve LS for the clutch C1 reaches a predetermined value, it can be determined that engagement is completed. The same determination method can be employed even for completion of engagement of other engaging mechanisms.

In step 3, the brake F1 is switched from the one-way rotation permission state to the rotation inhibition state. Since the difference between the rotation speed of the brake F1 on the side of the casing 12 and that on the side of the carrier Cr2 is 0, occurrence of unusual noise or vibration can be avoided. When switching of the brake F1 is completed, the process advances to step 4. In step 4, the clutch C1 and the brake B3 are released, and the brake B2 engages. The combination for the reverse range thus holds (FIG. 2A).

In some cases, the processing in steps 2 and 3 is called RVS preparation processing, and the processing of step 4 is called RVS in-gear processing. In terms of control, when step 1 is completed, an RVS preparation mode is set as the control state of the gear range. When the RVS preparation mode is set, RVS preparation processing is performed. In addition, when step 3 is completed, an RVS in-gear mode is set as the control state of the gear range. When the RVS in-gear mode is set, RVS in-gear processing is performed. Such mode setting is managed by, for example, providing a mode information storage area in the storage unit 102. An example of processing executed by the processing unit 101 concerning the control contents shown in FIG. 5 will be described later with reference to FIGS. 7A and 7B.

<Pre-Engagement Control>

If RVS preparation processing takes time, a time lag may occur from selection of the R range by the driver to establishment of the reverse range, and a smooth start may be impossible. In step 2 shown in FIG. 5, it is necessary to engage the three engaging mechanisms C1, C3, and B3. The larger the number of engaging mechanisms to be engaged is, the longer the time from the start of engagement to the completion of engagement is. In particular, a hydraulic engaging mechanism as in this embodiment readily takes time. For example, when simultaneously supplying necessary oil pressures to the engaging mechanisms to be engaged, it may be impossible to sufficiently ensure the supply amount of each oil pump, and the oil pressures may take time to rise. When sequentially supplying necessary oil pressures to the engaging mechanisms to be engaged, time is taken in proportion to the number of engaging mechanisms.

On the other hand, the state before selection of the R range is normally the lowest-speed forward range (first range in this embodiment) or the non-running range. Hence, in this embodiment, pre-engagement control of at least one of the engaging mechanisms to be engaged in RVS preparation processing is started at the stage of the first range or non-running range. Note that in this embodiment, pre-engagement control is possible in both a case where the gear range is the first range and a case where the shift position is the non-running range. However, an arrangement that performs pre-engagement control only in either case can also be employed.

A plurality of engaging mechanisms can undergo pre-engagement control. However, engaging a plurality of engaging mechanisms may need time. Hence, in this embodiment, one engaging mechanism is subject to pre-engagement control. The engaging mechanism to perform pre-engagement control is changed depending on the condition in pre-engagement control, as will be described below, thereby selecting an engaging mechanism suitable for each condition.

In the first range, the engaging mechanism to perform pre-engagement control is the engaging mechanism B3 out of the three engaging mechanisms C1, C3, and B3 that engage in step 2 shown in FIG. 5. In the arrangement of the automatic transmission 1 according to this embodiment, if the engagement combination for the first range shown in FIG. 2A is formed by setting the brake F1 in the one-way rotation permission state, the enable and disable states of the engine brake can be switched by engaging or releasing the engaging mechanism B3. Hence, even when pre-engagement of the engaging mechanism B3 is started, it does not interfere with running.

In the non-running range, the engaging mechanism to perform pre-engagement control is different from that in the first range. In the non-running range, it is the engaging mechanism C2 out of the three engaging mechanisms C1, C3, and B3 that engage in step 2 shown in FIG. 5. In the arrangement of the automatic transmission 1 according to this embodiment, even if pre-engagement of the engaging mechanism C3 is started, the vehicle does not start unexpectedly.

Figure 6:
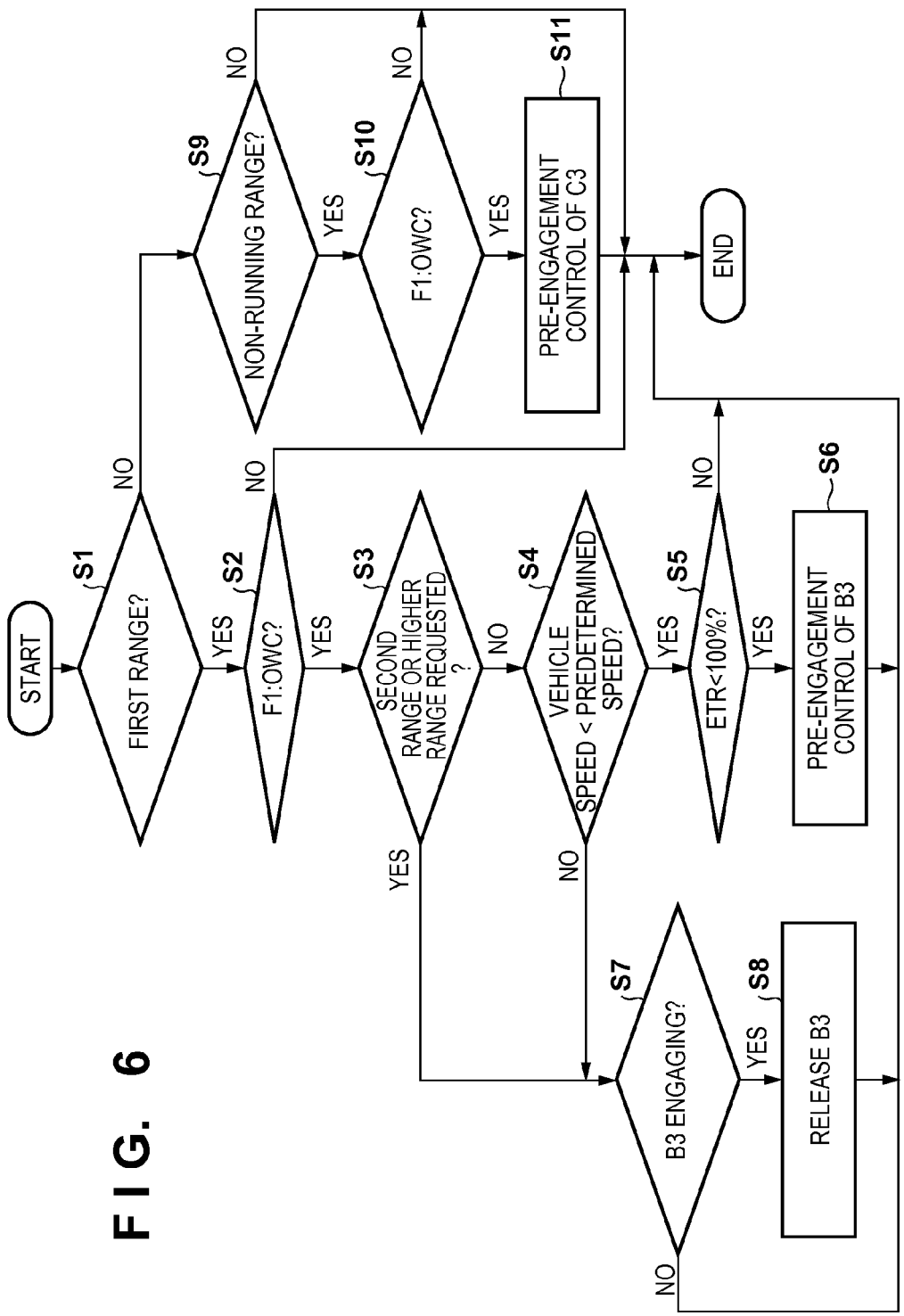
FIG. 6 is a flowchart showing an example of processing of the control apparatus shown in FIG. 4A.

An example of processing executed by the processing unit 101 concerning the pre-engagement control will be described next with reference to FIG. 6. The processes of steps S1 to S8 show an example of processing when performing pre-engagement control in the first range, and the processes of steps S9 to S11 show an example of processing when performing pre-engagement control in the non-running range.

In step S1, it is determined whether the current gear range is the first range. If the current gear range is the first range, the process advances to step S2. If the current gear range is not the first range, the process advances to step S9. In step S2, it is determined whether the brake F1 is in the OWC (one-way rotation permission state). If the brake F1 is in the OWC, the process advances to step S3. If the brake F1 is in the TWC (rotation inhibition state), the processing of one unit ends.

In step S3, it is determined whether selection of a forward range corresponding to the second range or higher speed range is requested by gear change control processing or a driver instruction (for example, paddle operation or selection of snow driving mode). If selection is not requested, the process advances to step S4. If selection is requested, the possibility of switching to the reverse range is low. Hence, the process advances to step S7 without performing pre-engagement of the brake B2. In this embodiment, if a gear range of higher speed than the lowest-speed forward range is requested, pre-engagement control of the brake B3 is not performed. However, an arrangement that does not include this condition can also be employed.

In step S4, it is determined whether the vehicle speed is lower than a predetermined speed. If the vehicle speed is lower than the predetermined speed, the process advances to step S5. If the vehicle speed is equal to or higher than the predetermined speed, the process advances to step S7. If the vehicle speed is relatively high, the possibility of switching to the reverse range is low. Hence, in this embodiment, the conditions of pre-engagement control in the first range include a condition that the vehicle speed is lower than a predetermined speed. However, an arrangement that does not include this condition can also be employed. The predetermined speed can be, for example, 8 km/h. The predetermined speed may be, for example, 5 km/h. Alternatively, the predetermined speed may be, for example, 3 km/h.

In step S5, it is determined whether the slip ratio of the torque converter TC is lower than a predetermined value. More specifically, it is determined whether the above-described ETR is lower than 100%. If the ETR is lower than 100%, the process advances to step S6. If the ETR is equal to or higher than 100%, the processing of one unit ends.

If the ETR is lower than 100%, the vehicle is accelerating. Conversely, if the ETR is not lower than 100%, the vehicle is decelerating or running at a constant speed and the engine brake can take hold. As already described, the engaging mechanism B3 enables the engine brake by engaging. Hence, if the ETR is not lower than 100%, the engaging mechanism B3 may be difficult to engage, or the engine brake may strongly take effect and affect the comfort to ride. Hence, in this embodiment, the conditions of pre-engagement control in the first range include a condition that the ETR is lower than a predetermined value. However, an arrangement that does not include this condition can also be employed.

In step S6, pre-engagement control of the engaging mechanism B3 starts. More specifically, oil pressure supply to the engaging mechanism B3 starts. When the reverse range is selected later, the engaging mechanism B3 is on the road to engagement or has already completed engagement. It is therefore possible to shorten the time necessary for step 2 shown in FIG. 5. Note that the conditions to start pre-engagement control can include any conditions other than those of steps S1 to S5.

The processes of steps S7 and S8 are performed when the conditions are not met any more after the start of pre-engagement control of the engaging mechanism B3 in step S6. In step S7, it is determined whether pre-engagement control of the brake B3 is being performed. If pre-engagement control is being performed, the pre-engagement control ends in step S8, and the engaging mechanism is released.

In step S9, it is determined whether the current shift range is the non-running range. If the current shift range is the non-running range, the process advances to step S10. If the current shift range is not the non-running range, the processing of one unit ends. In step S10, it is determined whether the brake F1 is in the OWC (one-way rotation permission state). If the brake F1 is in the OWC, the process advances to step S11. If the brake F1 is in the TWC (rotation inhibition state), the processing of one unit ends.

In step S11, pre-engagement control of the engaging mechanism C3 starts. More specifically, oil pressure supply to the engaging mechanism C3 starts. When the reverse range is selected later, the engaging mechanism C3 is on the road to engagement or has already completed engagement. It is therefore possible to shorten the time necessary for step 2 shown in FIG. 5. Note that the conditions to start pre-engagement control can include any conditions other than those of steps S9 and S10.

In pre-engagement control of the engaging mechanism B3 in step S6 or in pre-engagement control of the engaging mechanism C3 in step S11, the oil pressure at the time of completion of engagement may be lower than a normal predetermined oil pressure.

Especially in the non-running range, pre-engagement control of the engaging mechanism C3 may be done such that the engaging mechanism C3 engages under an oil pressure lower than a normal predetermined oil pressure (for example, the supply amount of hydraulic oil is decreased). Engagement of the engaging mechanism C3 is not included in the engagement combination for the first range (FIG. 2A). When engaged under an oil pressure lower than the normal predetermined oil pressure, the engaging mechanism C3 is readily released. It is therefore possible to prevent the establishment of the engagement combination for the first range from largely delaying upon switching from the non-running range to the forward range.

<Switching Control to Reverse Range>

An example of processing executed by the processing unit 101 concerning the control contents shown in FIG. 5 will be described with reference to FIGS. 7A and 7B.

Figure 7B:
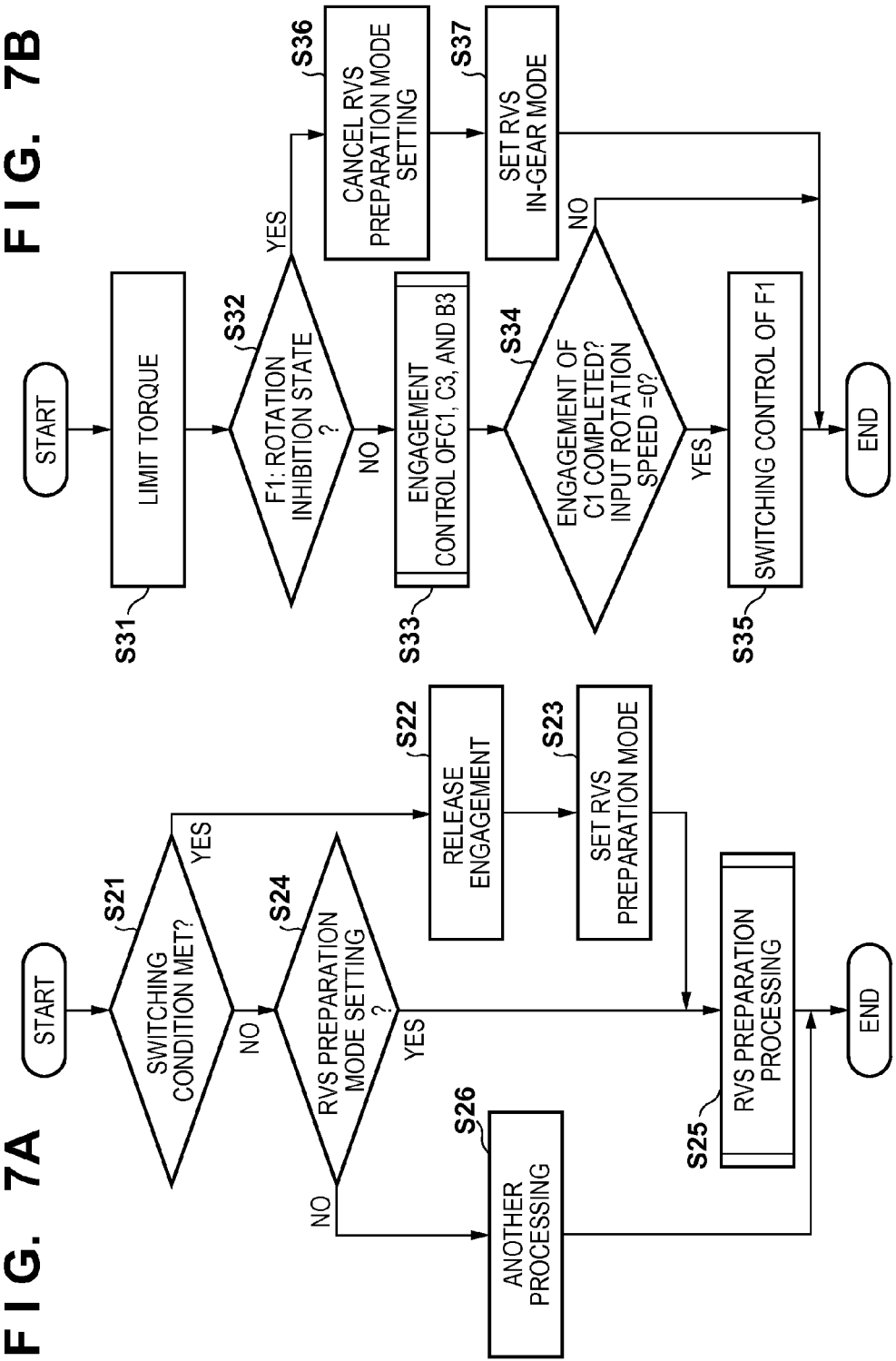
FIGS. 7A and 7B are flowcharts showing an example of processing of the control apparatus shown in FIG. 4A.
Figure 7A:
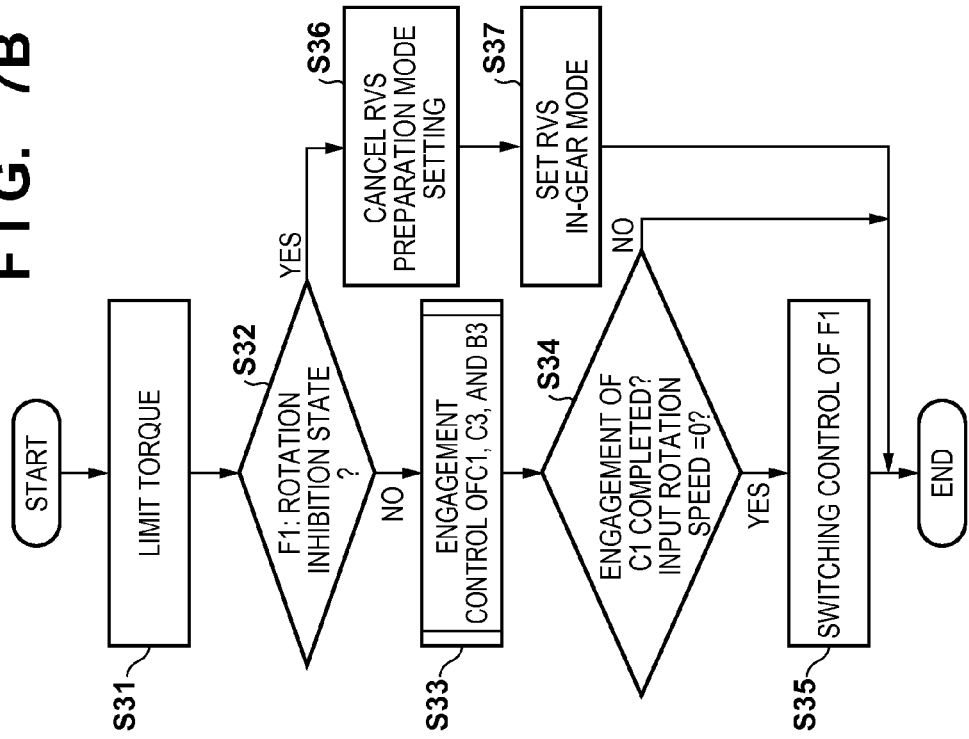

FIG. 7A will be referred to. In step S21, it is determined whether a condition to switch the brake F1 from the one-way rotation permission state to the rotation inhibition state is met. In this embodiment, if the brake F1 is in the one-way rotation permission state, and the SP sensor 114 detects that the driver has switched the shift range from another range to the reverse range, it is determined that the condition is met. If YES in step S21, the process advances to step S22. Otherwise, the process advances to step S24.

In step S22, the engaging mechanisms (for example, brakes B1 and B2) in the engaging state are released, as described concerning step 1 shown in FIG. 5. In step S23, the RVS preparation mode is set as the control mode. After that, the process advances to step S25.

In step S24, it is determined whether the RVS preparation mode is set. If YES in step S24, the process advances to step S25. Otherwise, the process advances to step S26. In step S25, RVS preparation processing is performed. Details will be described later. In step S26, another processing is performed, and the processing of one unit ends.

FIG. 7B will be referred to. FIG. 7B is a flowchart showing RVS preparation processing of step S25. In step S31, torque limitation of the driving source of the automatic transmission 1 is performed. For example, the output of the internal combustion engine EG is reduced within the range in which the necessary oil pressures of the engaging mechanisms and the like are ensured.

In step S32, it is determined whether switching of the brake F1 to the rotation inhibition state is completed. If YES in step S32, the process advances to step S36. Otherwise, the process advances to step S33.

In step S33, control to engage the clutches C1 and C3 and the brake B3 starts, as described concerning step 2 shown in FIG. 5. Details will be described later.

In step S34, it is determined whether engagement of the clutch C1 is completed, and the rotation speed of the input shaft 10 is 0, as described concerning step 2 shown in FIG. 5. If all the conditions are met, the process advances to step S35. If not all the conditions are met, the processing of one unit ends.

In step S35, the state of the brake F1 is switched to the rotation inhibition state, as described concerning step 3 shown in FIG. 5. Since the switching is done in a state in which the difference between the rotation speed of the brake F1 on the side of the casing 12 and that on the side of the carrier Cr2 is 0, it is possible to prevent occurrence of unusual noise or vibration and avoid breakage of the brake F1.

In step S36, setting of the RVS preparation mode is canceled. In step S37, the RVS in-gear mode is set. With this setting, processing of releasing the clutch C1 and the brake B3 and engaging the brake B2 is performed, as described concerning step 4 shown in FIG. 5, in another routine (for example, step S26 in FIG. 7A). The processing thus ends.

Figure 8:
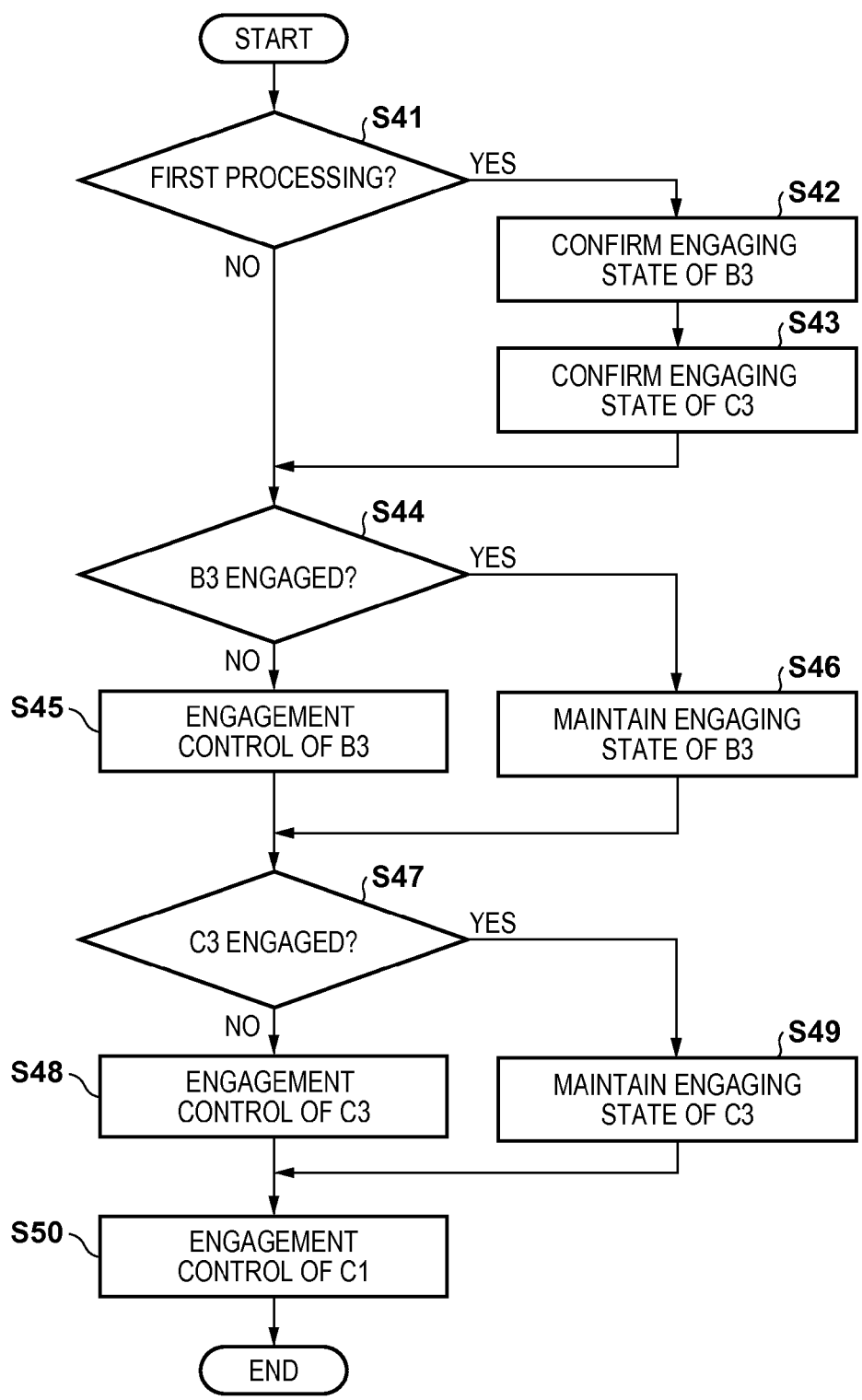
FIG. 8 is a flowchart showing an example of processing of the control apparatus shown in FIG. 4A.

Engagement control of step S33 will be described next with reference to FIG. 8. Engagement of the clutches C1 and C3 and the brake B3 can be done by increasing the control amount of the solenoid valve LS stepwise. When the process of step S23 is repeated a plurality of times, the engagement is completed. In this embodiment, engagement control of the brake B3 or clutch C3 is started by pre-engagement control in some cases. Hence, the processing shown in FIG. 8 is executed.

In step S41, it is determined whether the processing is the first processing. If the processing is the first processing, the process advances to step S42. If the processing is not the first processing, the process advances to step S44. The first processing means the process of step S33 for the first time after setting the RVS preparation mode (step S23). In the first processing, the processes of steps S42 and S43 are executed to confirm the presence/absence of pre-engagement control and the engaging state.

In step S42, processing of confirming the engaging state of the brake B3 is performed. Here, for example, if the oil pressure supplied to the brake B3 is a predetermined value or more, it is determined that the engagement is completed. As another example, for example, if the control amount of the solenoid valve LS of the brake B3 reaches a predetermined value, it may be determined that the engagement is completed. In step S43, processing of confirming the engaging state of the clutch C3 is performed. This is the same as the process of step S43. After that, the process advances to step S44.

In step S44, it is determined based on the confirmation result of step S42 whether the engagement of the brake B3 is completed. If the engagement is not completed, the process advances to step S45. If the engagement is completed, the process advances to step S46. In step S45, engagement control of the brake B3 is performed. Here, the control amount of the solenoid valve LS of the brake B3 is increased stepwise. In step S46, the engaging state of the brake B3 is maintained. For example, control is performed to maintain the oil pressure supplied to the brake B3 to a predetermined oil pressure.

In step S47, it is determined based on the confirmation result of step S43 whether the engagement of the clutch C3 is completed. If the engagement is not completed, the process advances to step S48. If the engagement is completed, the process advances to step S47. In step S48, engagement control of the clutch C3 is performed. In step S49, the engaging state of the clutch C3 is maintained. The processes of steps S48 and S49 are the same as those of steps S45 and S46, respectively.

In step S50, engagement control of the clutch C1 is performed. Since the clutch C1 has not undergone pre-engagement control, the engagement control of the clutch C1 starts in this processing, and the control amount of the solenoid valve LS of the clutch C1 is increased stepwise. The processing of one unit thus ends.

<Summary of Embodiment>

1. A control apparatus (for example, 100) according to the above embodiment is
a control apparatus for an automatic transmission (for example, 1),
the automatic transmission comprising:
an input shaft (for example, 10) to which a driving force is input;
an output member (for example, 11);
a plurality of planetary gear mechanisms (for example, P1-P4) configured to transmit the driving force input to the input shaft to the output member; and
a plurality of engaging mechanisms (for example, C1-C3, B1-B3, F1) capable of establishing a plurality of gear ranges by switching a transmission path of the driving force in the plurality of planetary gear mechanisms,
wherein one of the plurality of engaging mechanisms comprises a mechanical engaging mechanism (for example, F1) configured to function as a brake,
the mechanical engaging mechanism can be switched between a first state in which rotation of a predetermined rotational element (for example, Cr1, Cr2) out of a plurality of rotational elements included in the plurality of planetary gear mechanisms is restricted only in one direction and a second state in which the rotation of the predetermined rotational element is restricted in both directions,
the plurality of gear ranges include
at least one forward range (for example, 1st-10th) that can be established in the first state of the mechanical engaging mechanism, and
a reverse range (for example, RVS) to be established in the second state of the mechanical engaging mechanism,
the control apparatus comprises:
a detection unit (for example, 114) configured to detect a shift position; and
a control unit (for example, 101) configured to control the plurality of engaging mechanisms,
the control unit executes switching control (for example, S25) to switch the mechanical engaging mechanism from the first state to the second state when the detection unit detects that the shift position is switched to the reverse range and the mechanical engaging mechanism is in the first state,
in the switching control, after a plurality of predetermined engaging mechanisms (for example, C1, C3, B3) other than the mechanical engaging mechanism out of the plurality of engaging mechanisms are controlled to an engaging state, the mechanical engaging mechanism is switched from the first state to the second state,
the control unit starts pre-engagement control (for example, S5) to engage at least one engaging mechanism (for example, B3) out of the plurality of predetermined engaging mechanisms when a first condition is met, and
the first condition includes a condition that the mechanical engaging mechanism is in the first state and the automatic transmission is under a lowest-speed forward range (for example, S1, S2).

According to this arrangement, since control to set, in the engaging state, some engaging mechanisms to be engaged by the switching control starts in the lowest-speed forward range, the switching control can be ended in a relatively short time when switching to the reverse range. For this reason, when the reverse range is selected, smoother start can be implemented.

2. In the control apparatus according to the above embodiment, an engaging mechanism (for example, B3) that is subject to the pre-engagement control enables an engine brake by engagement in the lowest-speed forward range.

According to this arrangement, control to set, in the engaging state, some engaging mechanisms to be engaged by the switching control can be started without any disadvantage in establishment of the lowest-speed forward range.

3. In the control apparatus according to the above embodiment, the first condition includes a condition that the mechanical engaging mechanism is in the first state, the gear range is the lowest-speed forward range and a vehicle speed is less than a predetermined vehicle speed (for example, S4).

According to this arrangement, control to set, in the engaging state, some engaging mechanisms to be engaged by the switching control is started, thereby preventing the engine brake from taking effect too strongly.

4. In the control apparatus according to the above embodiment, the driving force is input to the input shaft through a torque converter (for example, TC), and the first condition includes a condition that the mechanical engaging mechanism is in the first state, the gear range is the lowest-speed forward range and a slip ratio of the torque converter is less than a predetermined value (for example, S5).

According to this arrangement, it is possible to easily engage some engaging mechanisms to be engaged by the switching control.

5. In the control apparatus according to the above embodiment, the control unit starts the pre-engagement control (for example, S11) when a second condition is met as well, the second condition includes a condition that the mechanical engaging mechanism is in the first state and the detection unit detects that the shift position is a non-running range (for example, S9, S10), and an engaging mechanism (for example, B3, C3) that is subject to the pre-engagement control changes between a case where the pre-engagement control starts when the first condition is met and a case where the pre-engagement control starts when the second condition is met.

According to this arrangement, since control to set, in the engaging state, some engaging mechanisms to be engaged by the switching control starts in the non-running range, the switching control can be ended in a relatively short time when switching to the reverse range. For this reason, when the reverse range is selected, smoother start can be implemented. In addition, the engaging mechanism to be set in the engaging state is changed between the first condition and the second condition. It is therefore possible to select an engaging mechanism suitable for each condition and prevent the vehicle from unexpectedly starting.

6. In the control apparatus according to the above embodiment, an engaging mechanism (for example, C3) that is subject to the pre-engagement control when the second condition is met is an engaging mechanism that does not engage in the lowest-speed forward range and comprises a hydraulic friction engaging mechanism, and in the pre-engagement control performed when the second condition is met, the hydraulic friction engaging mechanism that is subject to the pre-engagement control engages under an oil pressure lower than an oil pressure in normal engagement control.

According to this arrangement, when switching from the non-running range to a running range and starting in the lowest-speed forward range, smooth start can be implemented.

7. In the control apparatus according to the above embodiment, each engaging mechanism other than the mechanical engaging mechanism out of the plurality of engaging mechanisms comprises a hydraulic friction engaging mechanism, and in the pre-engagement control, supply of an oil pressure to the engaging mechanism that is subject to the pre-engagement control starts.

According to this arrangement, the number of engaging mechanisms to which the oil pressures are supplied simultaneously in the switching control can be decreased. It is therefore possible to complete the switching control in a shorter time and reduce the size of a pump that supplies the oil pressure.

8. In the control apparatus according to the above embodiment, in the pre-engagement control, engagement of one engaging mechanism out of the plurality of predetermined engaging mechanisms starts.

According to this arrangement, the number of engaging mechanisms to be engaged in advance by the pre-engagement control can be minimized.

9. In the control apparatus according to the above embodiment, the plurality of predetermined engaging mechanisms are engaging mechanisms selected so as to change a rotation speed of the predetermined rotational element (for example, Cr1, Cr2) to 0 by engagement.

According to this arrangement, it is possible to prevent occurrence of unusual noise or vibration upon switching of the mechanical engaging mechanism and lower the probability of breakage of the mechanical engaging mechanism.

10. A control apparatus (for example, 100) according to the above embodiment is a control apparatus of an automatic transmission (for example, 1), the automatic transmission comprising: an input shaft (for example, 10) to which a driving force is input;

an output member (for example, 11);

a plurality of planetary gear mechanisms (for example, P1-P4) configured to transmit the driving force input to the input shaft to the output member; and a plurality of engaging mechanisms (for example, C1-C3, B1-B3, F1) capable of establishing a plurality of gear ranges by switching a transmission path of the driving force in the plurality of planetary gear mechanisms, wherein one of the plurality of engaging mechanisms comprises a mechanical engaging mechanism (for example, F1) configured to function as a brake, the mechanical engaging mechanism can be switched between a first state in which rotation of a predetermined rotational element (for example, Cr1, Cr2) out of a plurality of rotational elements included in the plurality of planetary gear mechanisms is restricted only in one direction and a second state in which the rotation of the predetermined rotational element is restricted in both directions, the plurality of gear ranges include at least one forward range (for example, 1st-10th) that can be established in the first state of the mechanical engaging mechanism, and a reverse range (for example, RVS) to be established in the second state of the mechanical engaging mechanism, the control apparatus comprises:

a detection unit (for example, 114) configured to detect a shift position; and a control unit (for example, 101) configured to control the plurality of engaging mechanisms, the control unit executes switching control (for example, S26) to switch the mechanical engaging mechanism from the first state to the second state when the detection unit detects that the shift position is switched to the reverse range and the mechanical engaging mechanism is in the first state, in the switching control, after a plurality of predetermined engaging mechanisms (for example, C1, C3, B3) other than the mechanical engaging mechanism out of the plurality of engaging mechanisms are controlled to an engaging state, the mechanical engaging mechanism is switched from the first state to the second state, and the control unit starts pre-engagement control (for example, S11) to engage at least one engaging mechanism out of the plurality of predetermined engaging mechanisms when the mechanical engaging mechanism is in the first state and the detection unit detects that the shift position is a non-running range (for example, S9, S10).

According to this arrangement, since control to set, in the engaging state, some engaging mechanisms to be engaged by the switching control starts in the non-running range, the switching control can be ended in a relatively short time when switching to the reverse range. For this reason, when the reverse range is selected, smoother start can be implemented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control apparatus for an automatic transmission, the automatic transmission comprising:
   an input shaft to which a driving force is input;
   an output member;
   a plurality of planetary gear mechanisms configured to transmit the driving force input to the input shaft to the output member; and
   a plurality of engaging mechanisms for establishing a plurality of gear ranges by switching a transmission path of the driving force in the plurality of planetary gear mechanisms,
   wherein one of the plurality of engaging mechanisms comprises a mechanical engaging mechanism configured to function as a brake,
   the mechanical engaging mechanism can be switched between a first state in which rotation of a predetermined rotational element out of a plurality of rotational elements included in the plurality of planetary gear mechanisms is restricted only in one direction and a second state in which the rotation of the predetermined rotational element is restricted in both directions,
   the plurality of gear ranges include
   at least one forward range that can be established in the first state of the mechanical engaging mechanism, and
   a reverse range to be established in the second state of the mechanical engaging mechanism,
   the control apparatus comprises:
   a detection unit configured to detect a shift position; and
   a control unit configured to control the plurality of engaging mechanisms,
   the control unit executes switching control to switch the mechanical engaging mechanism from the first state to the second state when the detection unit detects that the shift position is switched to the reverse range and the mechanical engaging mechanism is in the first state,
   in the switching control, after a plurality of predetermined engaging mechanisms other than the mechanical engaging mechanism out of the plurality of engaging mechanisms are controlled to an engaging state, the mechanical engaging mechanism is switched from the first state to the second state,
   the control unit starts pre-engagement control to engage at least one engaging mechanism out of the plurality of predetermined engaging mechanisms when a first condition is met, and
   the first condition includes a condition that the mechanical engaging mechanism is in the first state and the automatic transmission is under a lowest-speed forward range.

2. The apparatus according to claim 1, wherein an engaging mechanism that is subject to the pre-engagement control enables an engine brake by engagement in the lowest-speed forward range.

3. The apparatus according to claim 2, wherein the first condition includes a condition that the mechanical engaging mechanism is in the first state, the gear range is the lowest-speed forward range and a vehicle speed is less than a predetermined vehicle speed.

4. The apparatus according to claim 2, wherein the driving force is input to the input shaft through a torque converter, and
   the first condition includes a condition that the mechanical engaging mechanism is in the first state, the gear range is the lowest-speed forward range and a slip ratio of the torque converter is less than a predetermined value.

5. The apparatus according to claim 1, wherein the control unit starts the pre-engagement control when a second condition is met as well,
   the second condition includes a condition that the mechanical engaging mechanism is in the first state and the detection unit detects that the shift position is a non-running range, and
   an engaging mechanism that is subject to the pre-engagement control changes between a case where the pre-engagement control starts when the first condition is met and a case where the pre-engagement control starts when the second condition is met.

6. The apparatus according to claim 1, wherein an engaging mechanism that is subject to the pre-engagement control when the second condition is met does not engage in the lowest-speed forward range and comprises a hydraulic friction engaging mechanism, and
   in the pre-engagement control performed when the second condition is met, the hydraulic friction engaging mechanism that is subject to the pre-engagement control engages under an oil pressure lower than an oil pressure in normal engagement control.

7. The apparatus according to claim 1, wherein each engaging mechanism other than the mechanical engaging mechanism out of the plurality of engaging mechanisms comprises a hydraulic friction engaging mechanism, and
   in the pre-engagement control, supply of an oil pressure to the engaging mechanism that is subject to the pre-engagement control starts.

8. The apparatus according to claim 1, wherein in the pre-engagement control, engagement of one engaging mechanism out of the plurality of predetermined engaging mechanisms starts.

9. The apparatus according to claim 1, wherein the plurality of predetermined engaging mechanisms are engaging mechanisms selected so as to change a rotation speed of the predetermined rotational element to 0 by engagement.

10. A control apparatus of an automatic transmission, the automatic transmission comprising:
    an input shaft to which a driving force is input;
    an output member;
    a plurality of planetary gear mechanisms configured to transmit the driving force input to the input shaft to the output member; and
    a plurality of engaging mechanisms for establishing a plurality of gear ranges by switching a transmission path of the driving force in the plurality of planetary gear mechanisms,
    wherein one of the plurality of engaging mechanisms comprises a mechanical engaging mechanism configured to function as a brake, the mechanical engaging mechanism can be switched between a first state in which rotation of a predetermined rotational element out of a plurality of rotational elements included in the plurality of planetary gear mechanisms is restricted only in one direction and a second state in which the rotation of the predetermined rotational element is restricted in both directions, the plurality of gear ranges include at least one forward range that can be established in the first state of the mechanical engaging mechanism, and a reverse range to be established in the second state of the mechanical engaging mechanism, the control apparatus comprises:

a detection unit configured to detect a shift position; and a control unit configured to control the plurality of engaging mechanisms, the control unit executes switching control to switch the mechanical engaging mechanism from the first state to the second state when the detection unit detects that the shift position is switched to the reverse range and the mechanical engaging mechanism is in the first state, in the switching control, after a plurality of predetermined engaging mechanisms other than the mechanical engaging mechanism out of the plurality of engaging mechanisms are controlled to an engaging state, the mechanical engaging mechanism is switched from the first state to the second state, and the control unit starts pre-engagement control to engage at least one engaging mechanism out of the plurality of predetermined engaging mechanisms when the mechanical engaging mechanism is in the first state and the detection unit detects that the shift position is a non-running range.

* * * * *